United States Patent [19]

Sigerist

[11] Patent Number: 4,704,182

[45] Date of Patent: Nov. 3, 1987

[54] PRESS FOR APPLYING AN OVERLAY

[75] Inventor: Helmut Sigerist, Fort Langley, Canada

[73] Assignee: Venturetech Enterprises, Inc., Vancouver, Canada

[21] Appl. No.: 751,124

[22] Filed: Jul. 2, 1985

[51] Int. Cl.$^4$ .......................... B30B 5/02; B30B 15/34
[52] U.S. Cl. .................................. 156/475; 100/211; 156/492; 156/583.3
[58] Field of Search ............... 156/212, 213, 216, 479, 156/583.3, 475, 477.1, 478, 480, 481, 492; 100/211

[56] References Cited

U.S. PATENT DOCUMENTS

| | | | |
|---|---|---|---|
| 2,122,554 | 7/1938 | Brautigan | 156/DIG. 42 |
| 2,473,275 | 6/1949 | Brouns | 156/481 |
| 2,982,332 | 5/1961 | Garrett | 100/211 |
| 3,146,143 | 8/1964 | Bolesky | 156/475 |
| 3,149,018 | 9/1964 | Jacobson | 156/213 |
| 3,616,076 | 10/1971 | Gepkens | 156/479 |
| 4,447,282 | 5/1984 | Valerio | 156/583.3 |
| 4,475,976 | 10/1984 | Mittelstadt | 100/211 |

Primary Examiner—Donald E. Czaja
Assistant Examiner—J. Davis
Attorney, Agent, or Firm—Kolisch, Hartwell & Dickinson

[57] ABSTRACT

A press for applying an overlay to the exterior surfaces of an element where such surfaces have a convexity extending transversely of the longitudinal axis of the element. A tensed forming sheet is included in the press which is caused to wrap around the element to which the overlay is applied.

3 Claims, 4 Drawing Figures

PRESS FOR APPLYING AN OVERLAY

BACKGROUND AND SUMMARY OF THE INVENTION

This invention relates to a method and apparatus for applying an overlay to the exterior surface of an elongate component. More particularly, the invention concerns a press for applying an overlay sheet such as a veneer sheet to the exterior surface of the component, where such surface has a convexity extending transversely of its longitudinal axis and wherein the overlay during this applicatior is caused to wrap around said convexity to produce a smooth bonding of the overlay without experiencing cracking in the overlay, the capturing of air pockets, and other difficulties heretofore experienced when applying an overlay to a curved surface. The invention further concerns the method of applying an overlay to a component performed during operation of the press.

A general object of the invention is to provide a press of the above-indicated type which features a forming sheet of flexible material which is caused to wrap around the exterior surface of a component when applying an overlay interposed between the forming sheet and the surface of the component. With such wrapping, a wrapping around of the overlay on the surface of the component is produced.

Another object is to provide a press which includes a forming sheet of the above-indicated general description, and an attachment means for gripping an elongate expanse of the sheet which is moveable in a defined path to produce a wrap-around action. The attachment means may further include means for producing a displacement in the attachment means which is generally laterally of its path of movement for maintaining proper tensing of the forming sheet.

According to a preferred embodiment of the invention, heated clamps are provided which co-act with the forming sheet to produce heat induced bonding of the overlay to the component being overlaid.

Other objects and advantages are attained by the invention, which is described hereinbelow in conjunction with the accompanying drawings wherein.

Figure 1:
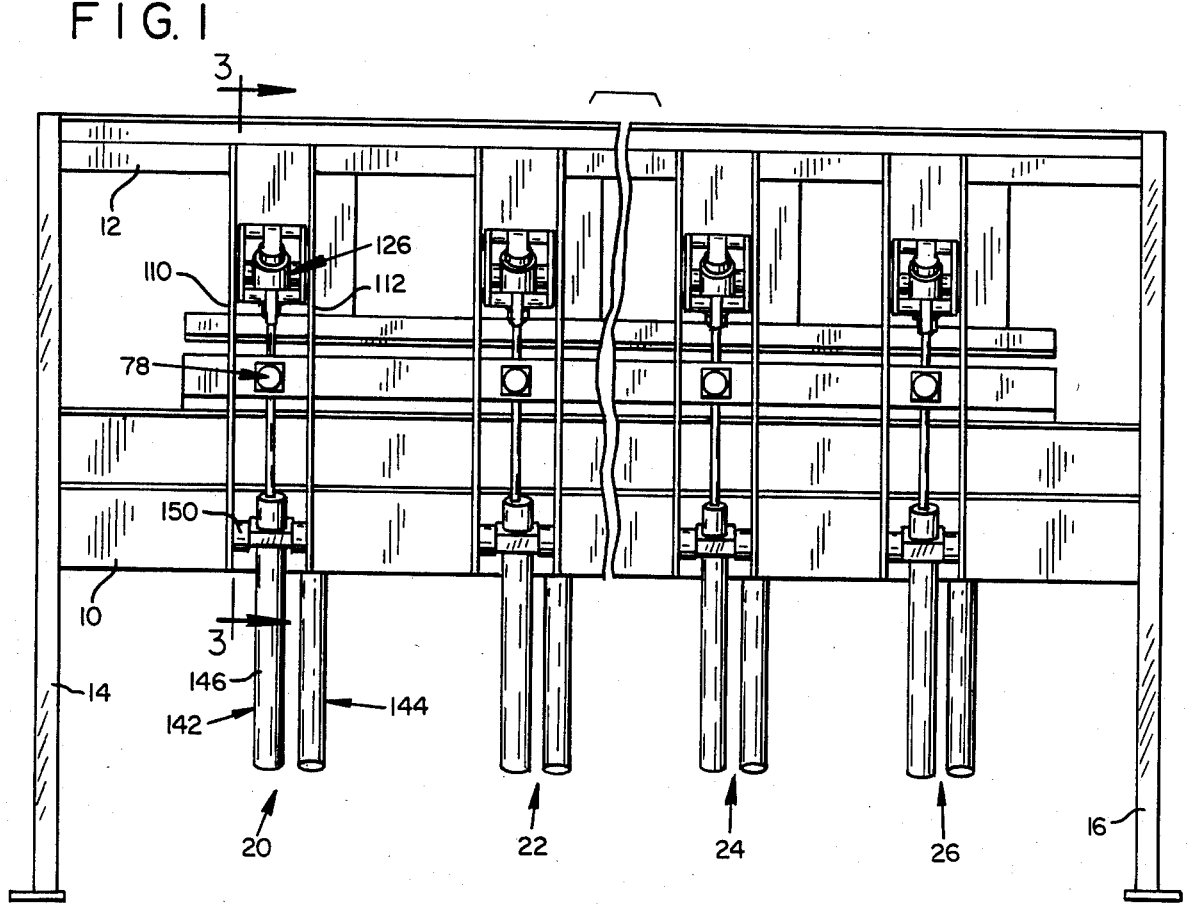
FIG. 1 is a side elevation, in somewhat simplified form, illustrating a press as contemplated herein.
Figure 2:
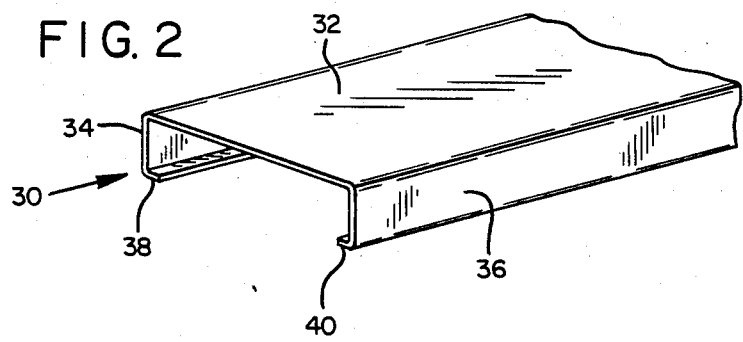
FIG. 2 is a cross-sectional view, taken generally along the line 2—2 in FIG. 1, and on a somewhat larger scale, illustrating in more detail the construction of the press.

Considering initially the press illustrated in FIGS. 1 and 2, such comprises an elongate frame work extending horizontally above the ground and including a lower frame beam 10 and an upper frame beam 12, such extending generally horizontally and providing support for the working parts of the press. These frame beams are rigidly interconnected and supported in a position elevated from the ground by framework including end frame stanchions shown at 14 and 16.

Shown at 20 adjacent one end of the press is an array of fluid-operated cylinders. Successive arrays of cylinders are shown at 22, 24, and 26, appearing at regularly spaced apart locations along the length of the press. As will become more fully apparent, the cylinders in the various arrays are actuated to apply clamping pressure against surfaces of a component being overlaid in the press, and in the manipulation of a forming sheet used in shaping an overlay over surfaces of the component.

Figure 3:
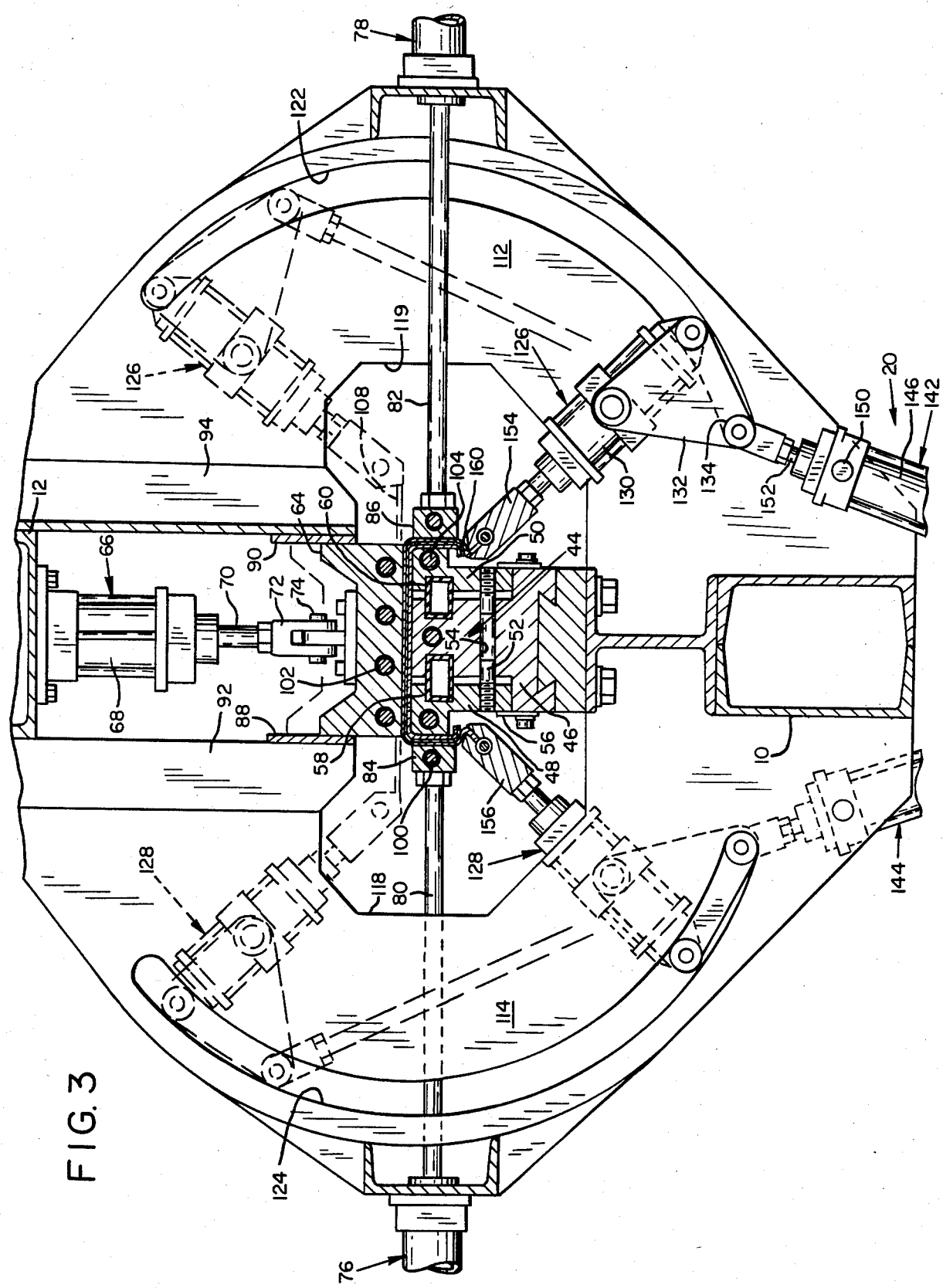
FIG. 3 is a perspective view illustrating a component of the type that might be processed in the press to have an overlay applied to it.

Illustrative of a component which may be overlaid with a sheet such as a veneer sheet is the elongate channelshaped piece shown in FIG. 3 generally at 30 which may be a formed sheet of metal used as part of a doorjamb in building construction. Such an element has a longitudinal axis extending along the length of the element. The exterior surface of the element includes top surface 32, edge surfaces 34, 36 joining with the top surface through bend regions, and bottom flange surfaces 38, 40 joining also through bend regions with edge surfaces 34, 36.

To beautify the element, an overlay such as a veneer sheet overlay is bonded to the various surfaces described. The side edge surfaces and flange surfaces, and the regions of bend interjoining the various surfaces, impart that is referred to herein as convexity to the exterior surface extending transversely of the longitudinal axis of the component.

In FIG. 2, the channel-shaped piece which is the component being provided with an overlay is shown in cross section. Such is mounted in what is referred to as an application station in the press, with the component extending horizontally along the press and through the various cylinder arrays earlier described.

Piece 30, and as can be best seen in FIG. 2, is supported within the press and while occupying the application station on a support shown generally at 44. Such comprises an elongate lower mounting block 46 which extends the length of the press under element 30 and which is secured in a suitable manner rigidly to be supported by lower frame beam extending beneath it. Extending along one side of an upper portion of this mounting block is an elongate laterally displaceable clamp block 48. A similar elongate clamp block 50 extends along the other side of the upper portion of the mounting block 46. These two clamp blocks are provided with guide rod 52 distributed along their respective lengths with inner ends seated within guide bores 54 distributed along the length of the mounting block. Laterally outward displacement of the clamp blocks is limited by stops 56. Elongate air bags 58, 60 interposed between the clamp blocks and mounting block 46 are inflated to urge the clamp blocks 48, 50 laterally outwardly. Suitable spring means (not shown) is provided for urging the clamp blocks laterally inwardly in the absence of air under pressure in the air bags 58, 60.

It should be obvious from what has been described that with air under pressure exhausted from the air bags and the clamp blocks shifted laterally inwardly, element 30 is readily positioned on the support structure provided by mounting block 46 and the clamp blocks. Once positioned and with the bags pressurized, piece 30 becomes firmly held within its interior.

Extending along the length of the interior of the press and disposed generally above support 44 is an elongate clamp bar 64. The array of fluid-operated cylinders illustrated in FIG. 2 includes fluid-operated cylinder 66 having its cylinder 68 mounted on the frame of the press and an extensible-contractable rod 70 which extends downwardly from the cylinder. Rod 70 has its lower end, through clevis 72 and pin 74, anchored to clamp bar 64. Each of the array of cylinders illustrated in FIG.

1 includes a cylinder similar to cylinder 66 which is similarly joined to the clamp bar.

With contraction of these cylinders, the clamp bar is raised to place it in the position indicated in dashed outline in FIG. 2. Extension of the cylinders causes the clamp bar to move firmly downwardly against support 44 and any product supported thereon.

As illustrated in FIG. 2, cylinder array 20 further includes a pair of opposed cylinders 76, 78 with cylinder ends mounted on the frame of the press and inwardly extending extensible and contractable rod 80, 82 projecting from the cylinder ends of the cylinders. Inner ends of these rods are connected to elongate side clamps 84, 86. These clamps extend the length of the press and there are cylinders corresponding to cylinders 76, 78 in each of the array of cylinders earlier discussed. With extension of the rods of these cylinders, the clamps 84, 86 move inwardly to clamp firmly against the sides of any product supported on support 44.

At the location of each array of cylinders, clamp or clamp bar 64 is guided for up and down movement in guides 88, 90. Such are suitably mounted in place on frame elements 92, 94 which are portions of the frame of the machine.

Adhesive bonding of an overlay to the exterior surface of element 30 is promoted with the application of heat. Electrical heating elements shown at 100, 102, and 104 extending along the length of and within side clamps, clamp bar 64, and support 44, respectively, provide this heat.

With the press of the invention, a flexible sheet 108, referred to as a forming sheet, is manipulated so that with initial forming of the overlay about the element 40 such is progressively folded around the edge surfaces of element 30 and flange surfaces 38, 40 of the element. This forming sheet, shown in dashed outlined in FIG. 2 in its raised position and prior to forming, extends along the length of the press while maintained in a tensed condition by structure to be described. The sheet may be made of a plastic material such as Mylar having requisite strength and heat stability.

Considering now in more detail the structure for manipulating the forming sheet, and referring to FIG. 1, provided at the location of each cylinder array and on one side of the press are a pair of opposed cam plates 110, 112 spaced a slight distance from each other along the length of the press. These plates are secured to the frame of the press and housed between them what is referred to herein as a sheet-manipulating cylinder 126. In FIG. 2, the plate nearer the viewer has been removed so only plate 112 appears. It should be understood that plate 110 has a profile matching that of plate 112. A similar pair of plates are provided on the opposite side of the press, in the form of plate 114 shown in FIG. 2 and one which matches it but is spaced slightly behind plate 114 thus to be obscured from view in FIG. 2. Housed between these plates is a sheetmanipulating cylinder 128. The cam plates are apertured in a center region of the press, as illustrated at 118, 119. Matching plates on each side of the press are provided with elongate arcuate guide slots, as indicated at 122, 124.

The mounting for cylinders 126, 128 are similar. Thus, the cylinder end of each, as exemplified by cylinder end 130 of cylinder 126, is supported on traveling bracket plates 132 disposed on either side of the cylinder. Mounted on the bracket plates are cam rollers such as rollers 134, 136 which travel in a guide slot as exemplified by guide slot 122. The guide slot constitutes guide means forming an arcuate guide path guidably supporting cylinder 126. Cylinder 126 thus is provided with an arcuate path of movement, and in moving between the positions shown in solid and dashed outlines in FIG. 2, the cylinder is maintained at all times in a direction extending generally radially inwardly of guide slot 122.

Each of the array of cylinders earlier described includes a pair of positioning cylinders, indicated for array 20 at 142, 144. The cylinder ends of these cylinders are pivotally supported on the frame of the press to accomodate swinging of the cylinders in vertical planes. This pivot mounting for cylinder end 146 of cylinder 142 is indicated at 150 in FIG. 1. Reverting to FIG. 2, the rod ends of the positioning cylinders are journaled on the traveling bracket plates of the sheetmanipulating cylinders, as exemplified by rod end 152 of positioning cylinder 142.

Extension and contraction of the positioning cylinder in this manner serves to shift the manipulating cylinders 126, 128 in an array of cylinders along the arcuate paths of movement provided by the guide slots 122, 124.

What is referred to herein as an attachment clevis, bar is shown at 154. Such extends the length of the press and is mounted on the rod end of cylinder 126 in array of cylinders 120, and the rod ends of corresponding cylinders in the remaining array of cylinders. A similar attachment clevis bar is shown at 156 mounted on the rod end of cylinder 128 and the rod ends of similar cylinders in the remaining array of cylinders. The attachment clevis bars have bifurcated edges facing inwardly in FIG. 2 receiving margins of the forming sheet. These margins are securely held in place by the clevis bars. Each clevis bar constitutes an attachment means for gripping an elongate expanse of the forming sheet along an attachment region, and this attachment region is substantially parallel to the axis of component 30 occupying the application station within the press. The attachment region is also located outwardly of the transverse convexity of piece 30.

Explaining generally how the press described operates, prior to loading of the press, clamp bar 64 is raised and the forming sheet placed in its raised position as shown in dashed outline in FIG. 2, by moving cylinders 126, 128 to the raised positions indicated in dashed outline in FIG. 2. Side clamps 84, 86 are also retracted, i.e., shifted laterally outwardly. This permits an element 30 to be mounted on support 44 which such extending along the length of the press. After mounting of the piece on support 44, clamp blocks 48, 50 are urged laterally outwardly to clamp the piece through introducing air under pressure to bags 58, 60.

Overlay material is then placed over the top of piece 30 with such extending along the length of the piece. This overlay material may have adhesive coated on its under side for the purpose of bonding the overlay to the surface of piece 30. The press may then be actuated to bring the forming sheet downwardly on the veneer where such extends over the top of piece 30, and shift clamp bar 64 downwardly whereby such presses the forming sheet and the overlay against the top side of piece 30 which is beneath it. Various sequences may be employed at this stage. For instance, cylinders 126, 128 may be moved in their arcuate paths sufficiently to bring the forming sheet into contact with the top of the assembly being formed and then the clamp bar lowered to produce full clamping pressure. With shifting of the cylinders 126, 128 in their arcuate paths, the feed of pressure fluid to the cylinders is controlled whereby they yieldably pull on bars 154, 156 to maintain the forming sheet tense. With clamp bar 64 clamping against the top of the assembly in the press, such serves firmly to anchor a mid-region of the forming sheet which extends along the top of piece 30.

With continued adjusted movement in cylinders 126, 128 and their counterparts in the other cylinder arrays, the forming sheet and the overlay underneath it are caused in effect to be wrapped around first bend regions where edge surfaces 34, 36 join with top surface 32, then over the remainder portions of edge surfaces 34, 36, thence over the bend regions connecting these edge surfaces with flange surfaces 38, 40. During such movement of the cylinders 126, 128 the cylinders yieldably tense the forming sheet.

On cylinders 126, 128 reaching the position shown in solid outline in FIG. 3, the cylinders, and others corresponding to them in the remaining arrays of cylinders, are caused yieldably to extend, to produce the final wrapping action in the press.

With the overlay formed as described, side clamps 84, 86 are shifted, through extension of cylinder 76, 78, whereby they clamp against the sides of element 30. In this way, heat and pressure are applied to clamps pressing on the top and sides of element 30. In FIG. 2, the overlay covering flange element 30 is shown at 160.

After sufficient time to effect curing of the resinous bond between the overlay and the surfaces of piece 30, the press may be readied for a new piece through retraction of the various clamps, movement of the forming sheet to the position shown in dashed outline in FIG. 2, and the exhausting of air from air bags 58, 60.

Figure 4:
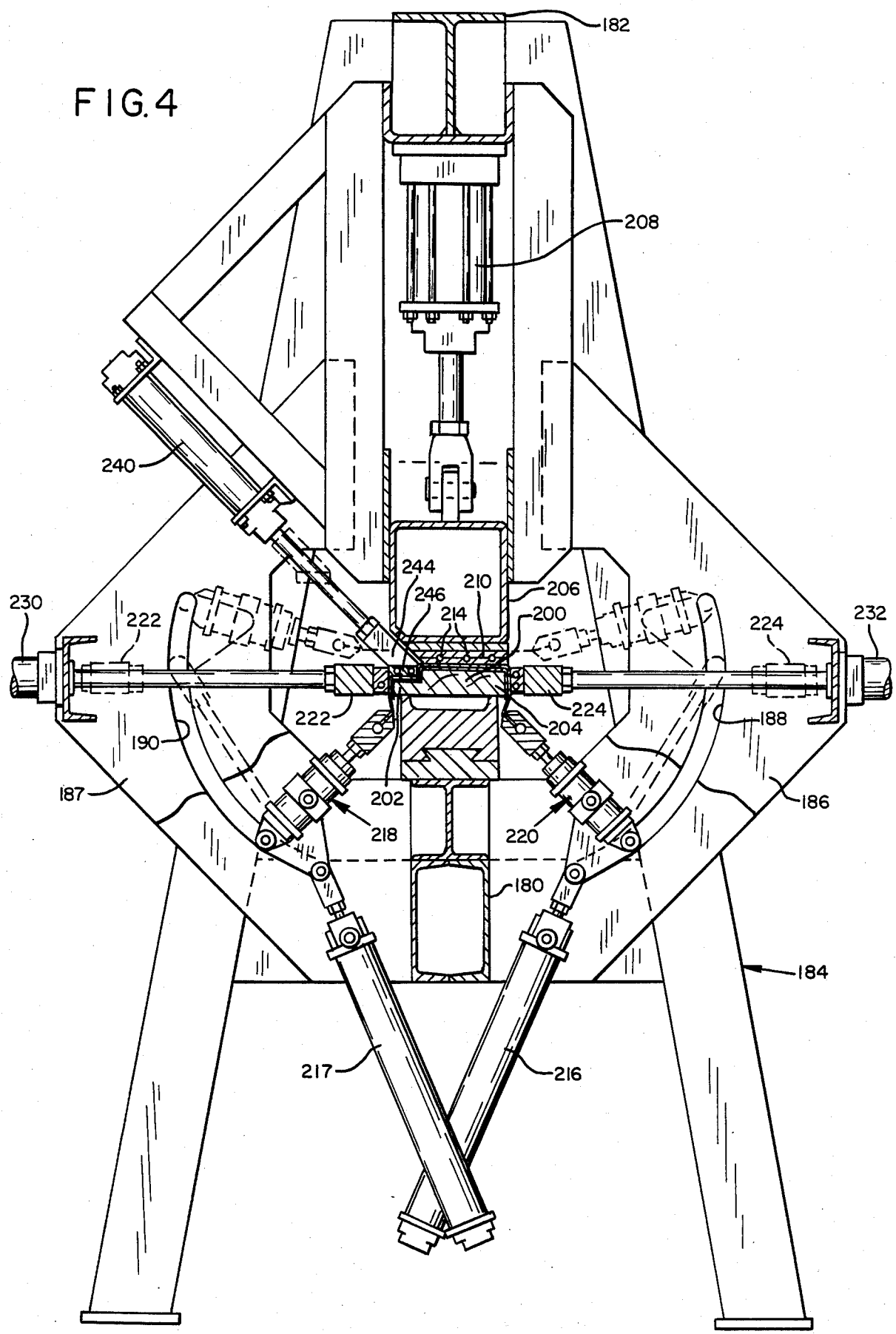
FIG. 4 is a cross-sectional view similar to FIG. 2, but illustrating a modified form of press.

Referring now to FIG. 4, the modified form of press therein illustrated is quite similar to the one just described. Thus, such includes a frame with lower and upper frame beams 180, 182 held in a rigid position elevated above the ground by stanchion structures such as stanchion 184. An array of fluid-operated cylinders are distributed adjacent cam plates 186, 187 suitably mounted in the frame and having guide slots 188, 190.

The press in FIG. 4 is adapted for the applying of an overlay to an elongate non-metallic component such as the wooden doorjamb shown at 200. The particular element illustrated has a step configuration in cross section, in that such includes a ledge portion 202 joining with a somewhat wider remainder portion 204.

Clamp bar or beam 206 is shifted vertically through operation of cylinder 208. Joined to the base of this beam and thus part of and moveable with the beam is an assembly comprising plates 210, 212 sandwiching between them heating elements 214.

As in the first modification of the invention, the array of cylinders includes sheet-manipulating cylinders, indicated at 218, 220, corresponding to cylinders 126, 128, mounted for guided movement in slots 188, 190. Positioning cylinders are shown at 216, 217.

Side clamps 222, 224 with heating assemblies are shifted inwardly and outwardly utilizing cylinders 230, 232 corresponding to cylinders 76, 78 in the first described modification.

In the form of the invention shown in FIG. 4, an additional cylinder is provided in the array of cylinders. Specifically, such comprises a cylinder 240 provided for the positioning of a clamp bar 244 terminating in a heating assembly 246. With extension of cylinder 240, bar 244 is caused to move downwardly finally to seat heating assembly 246 in the shelf defined between portions 202, 204 of the element being processed.

It should be obvious that a new type of press has been disclosed which is capable of applying an overlay to the exterior surface of an element such as a doorjamb, with the overlay in effect being wrapped about the exterior surface during forming of the overlay. Forming is performed through manipulation of a forming sheet, which itself is caused to be wrapped around the article being surfaced while forming the overlay.

While modifications of the invention have been shown and described herein, variations and other arrangements are possible without departing from the invention. It is desired to cover all such modifications and variations as would be apparent to one of ordinary skill in the art.

It is claimed and desired to secure by Letters Patent:

1. A press for applying an overlay sheet to the exterior surface of an elongate component where such surface has a convexity extending transversely of the longitudinal axis of the component, the press comprising:

means for mounting the component with the component occupying an application station in the press, a flexible forming sheet and means mounting the forming sheet with the sheet stretched and extending outwardly from said convexity, said forming sheet serving to form an overlay placed between the forming sheet and the component, said means mounting the forming sheet including attachment means for gripping an elongate expanse of the sheet in an attachment region substantially paralleling the axis of the component with the component in said station, said region being spaced from and to one side of the convexity, and means mounting said attachment means providing for movement of the attachment region in a nonlineal path having a concavity facing the convexity in the exterior surface of the component which path extends about such convexity and with said region maintained parallel to said axis, whereby said forming sheet wraps around said convexity with accompanying wrapping of an overlay around said convexity, said means mounting said attachment means including guide means defining an arcuate guide path extending about the convexity of said exterior surface and power-operated extensible-contractable means which on controlled extension and contraction changes the direction taken by said path including a piston cylinder guidably supported by said guide means with an extensible end connected to said attachment means.

2. A press for applying an overlay sheet to the exterior surface of an elongate component where such surface has a convexity extending transversely of the longitudinal axis of the component, the press comprising:

means for mounting the component with the component occupying an application station in the press, a flexible forming sheet and means mounting the forming sheet with the sheet stretched and extending outwardly from said convexity, said forming sheet serving to form an overlay placed between the forming sheet and the component, said means mounting the forming sheet including attachment means for gripping an elongate expanse of the sheet in an attachment region substantially paralleling the axis of the component with the component in said station, said region being spaced from and to one side of the convexity, and means mounting said attachment means providing for controlled powered movement of the position thereof, said means comprising a first piston-cylinder having an extensible contractible end connected to and supporting said attachment means which is controllably extensible and contractible toward and away from said convexity, a mounting for the first piston-cylinder that permits a change in the attitude of the first piston-cylinder relative to said convexity, and a second piston-cylinder operatively connected to said first piston cylinder which is controllably extensible and contractable to produce movement of the first piston-cylinder on its said mounting resulting in a change in the attitude of the first piston cylinder.

3. The press of claim 2, wherein the mounting for the first piston-cylinder comprises means guiding the first piston-cylinder for move ment with the extensible end of the first piston-cylinder during such movement moving across the convexity of the component.

* * * * *